Nov. 5, 1963

J. C. BERNIER 3,109,240

PERSPECTIVE DRAWING INSTRUMENT

Filed Dec. 4, 1961

INVENTOR
Jean Charles BERNIER
BY
ATTORNEYS

Nov. 5, 1963    J. C. BERNIER    3,109,240
PERSPECTIVE DRAWING INSTRUMENT
Filed Dec. 4, 1961    4 Sheets-Sheet 3

INVENTOR
Jean-Charles BERNIER
BY
ATTORNEYS

Nov. 5, 1963          J. C. BERNIER          3,109,240

PERSPECTIVE DRAWING INSTRUMENT

Filed Dec. 4, 1961          4 Sheets-Sheet 4

INVENTOR
Jean Charles BERNIER
BY
ATTORNEYS

United States Patent Office 3,109,240
Patented Nov. 5, 1963

3,109,240
PERSPECTIVE DRAWING INSTRUMENT
Jean Charles Bernier, 47 Ave. Glencoe, Montreal 8,
Quebec, Canada
Filed Dec. 4, 1961, Ser. No. 156,731
8 Claims. (Cl. 33—77)

The present invention relates to a drawing instrument or apparatus whereby, being given at least two of the classical orthogonal views of an object and having selected appropriate viewpoints and directions of viewing, it is possible to produce with comparative ease and rapidity the corresponding perspective view.

It is an important feature of the invention that the perspective views produced with it are true to the point of being exactly superimposable on photographic pictures taken from coinciding viewpoints and along identical center lines of viewing.

The invention is the result of what the inventor believes to be a new theoretical approach to the problem of producing perspective views of an object shown in plan and elevation, and it is intended as a short cut in the application of the new theoretical principle.

An object of the invention lies in the provision of an instrument of the aforesaid type which will make perspective image of an object initially represented by the usual plan and elevation views and to provide new mechanical means for a rapid and easy application of the invention.

A further object of the invention resides in the provision of an instrument of the above said type which will allow to yield a true perspective view of an object from any selected viewpoint and along any line of viewing through said viewpoint, directly and accurately.

Yet a further object of the invention is to provide an instrument for perspective drawing which will not require that the viewpoint be made accessible within the area of the drawing board and wherein the concept of vanishing points is neither used nor required.

Furthermore, use of the instrument may be made without any previous theoretical knowledge of perspective drawing. Also, the drawing instrument of the invention can be used by persons who are not artistically inclined or who have no particular experience beyond that of ordinary mechanical drawing. In fact, it is only necessary that the person using the instrument be capable of reading conventional mechanical drawings. However, for those who already possess a good working knowledge and experience of perspective drawing, the invention offers the added advantage of allowing an easy and accurate determination of all vanishing points, if desired.

A specific embodiment of an instrument of the invention and its principle will now be described in connection with the annexed drawings wherein.

Figure 1:
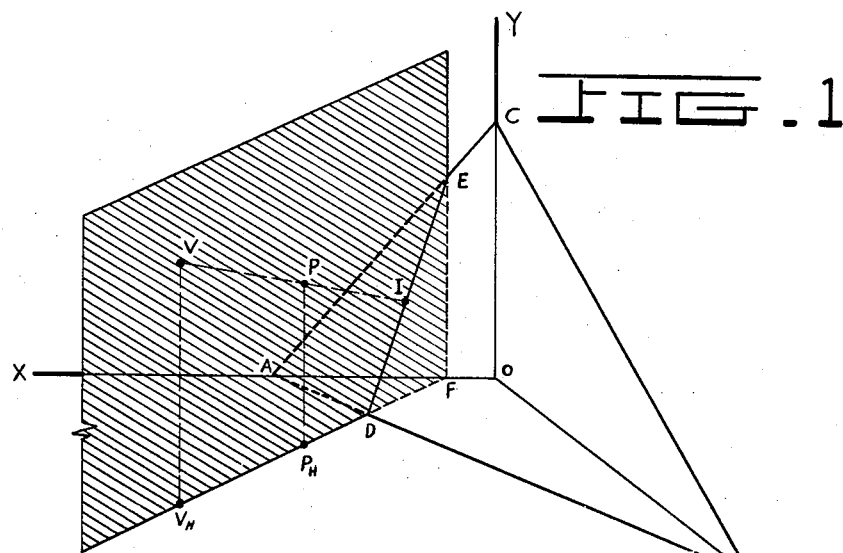
FIGURE 1 is a perspective representation of a problem to be solved.

FIGURE 1 is a perspective illustration of a problem to be solved. A particular point P of an object located in space is shown of which a perspective view or projection is desired on a picture plane ABC, from a selected viewpoint V. The orthogonal planes are defined by XOY and XOZ, respectively. $R_H$ and $V_H$ are the horizontal projections or plan views of points P and V respectively.

It can be seen that the projection of a line PV onto the picture plane ABC, will be located on an intercept DE which is that of the vertical plane containing the points P, $P_H$, V and $V_H$ with the picture plane ABC.

Figure 2:
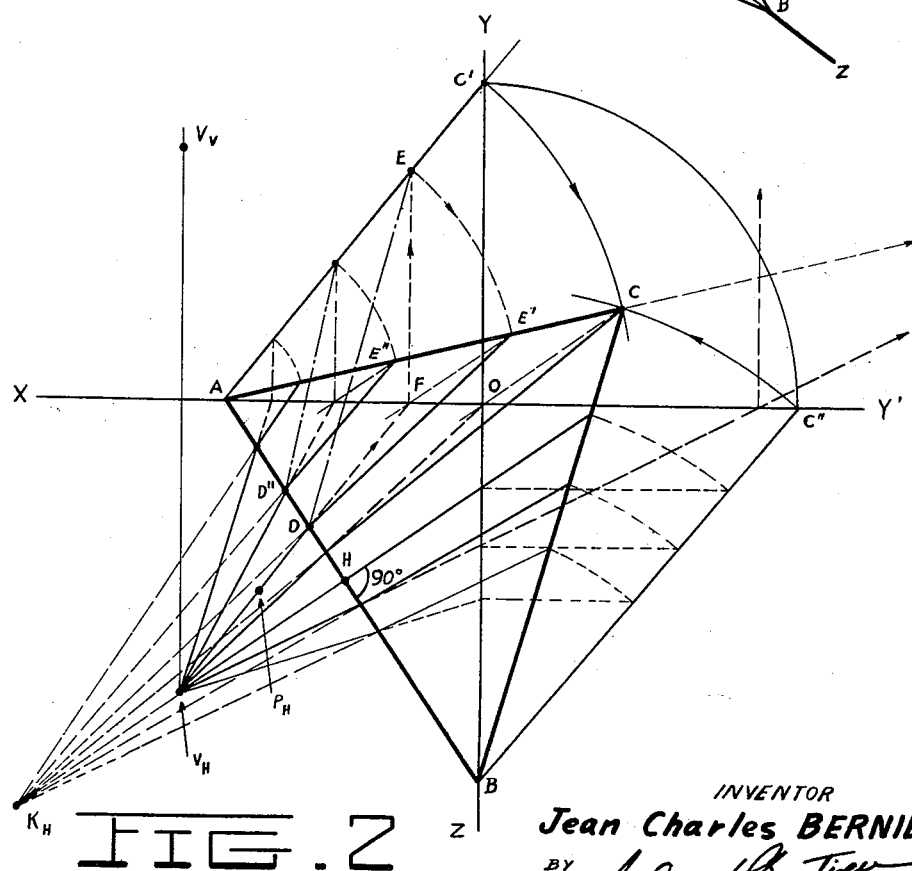
FIGURE 2 is a partial solution of the problem of FIGURE 1 in plane geometry.

FIGURE 2 shows how, starting with a plan view of points V and P, it is possible to obtain the exact location of line DE of the picture plane. In order to arrive at this determination, the picture plane ABC is revolved around its base AB located in the horizontal plane XOZ and, once rotated, the picture plane will be defined in its true size by the triangle ABC.

To obtain the location of a point such as E in FIGURE 1, lying in the picture plane, said point is revolved to a corresponding point E′ and thus, the projection of line DE in the horizontal plane is line DE′. We know that the projected image of point I (of FIG. 1) in the horizontal plane, will be located somewhere on this line DE or on an extension thereof. The locus of all any such points as I in the horizontal plane ABC, of FIGURE 2 is obtained in a similar manner; another example being the determination of locus D″E″. In order to obtain the exact position of the image of point E in the picture plane ABC of FIGURE 1, the above described operation would have to be repeated with a second view of point P in another orthogonal view, such as plane XOY.

It is important to note in FIGURE 2 that all the intercept lines such as DE′ and D″E″ converge to a common point $K_H$ so that line $K_H V_H$ is perpendicular to line AB. In fact, line $K_H V_H$ is the horizontal trace of the center line of vision. Point $K_H$ can be considered as one vanishing point of the classical perspective theory.

Figure 3:
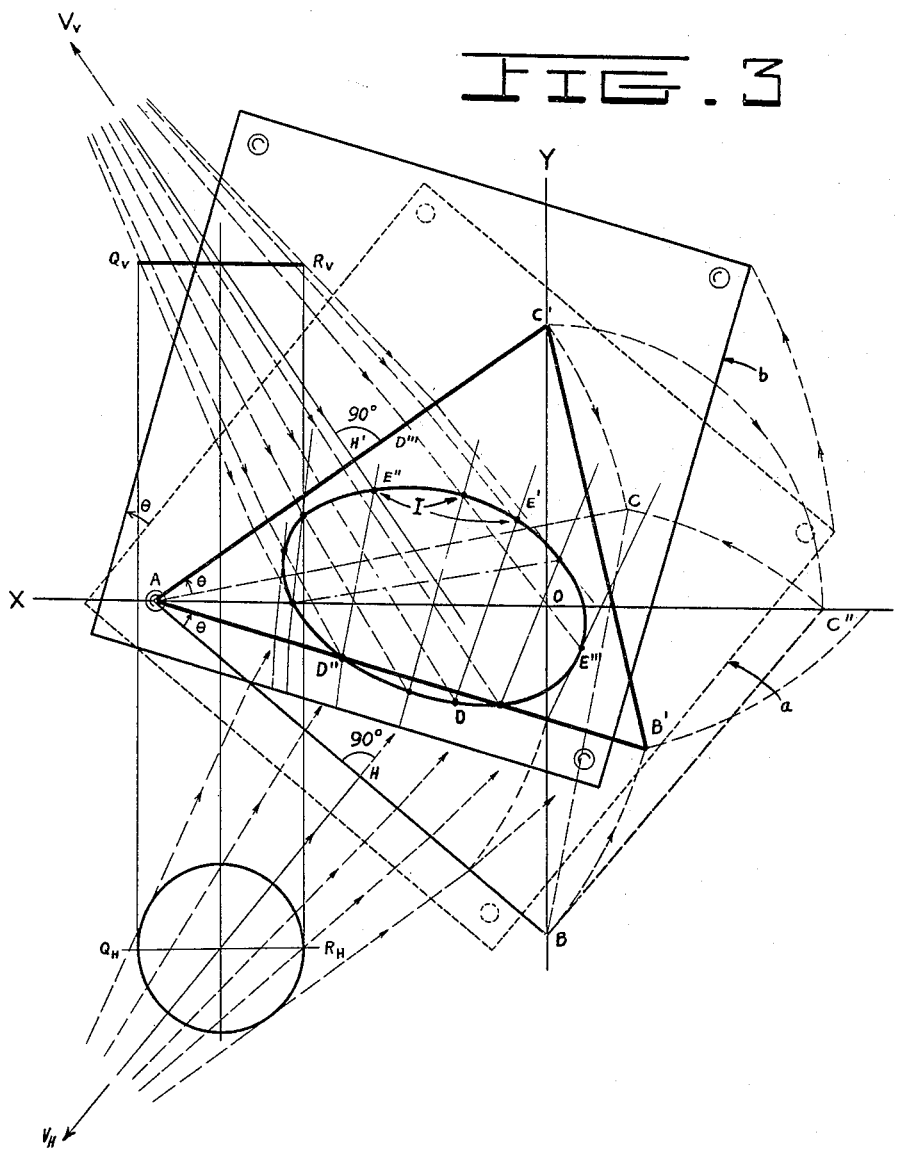
FIGURE 3 is a complete solution of the problem of FIGURE 1 in plane geometry wherein the object to be shown in perspective is a flat disc. The view is partly diagrammatic, in that it shows how the sheet of paper, on which the perspective is to be traced, is rotated through an angle.

FIGURE 3 illustrates a full application of the graphical method used in FIGURE 2 for the particular case of a circular disk represented, in elevation, by a straight line $Q_V R_V$ and, in plan, by a circle on whose periphery lie points $Q_H$ and $R_H$. In this case, the graphical method of FIGURE 2 is first performed and the projections through a number of reference points of the circle are traced on a piece of paper fastened to the drawing board in a position "a" shown in dotted lines. The lines, such as DE′ and D″E″, are thus obtained. Thereafter, the sheet of paper is rotated to a position "b" around point A as a pivot so as to bring line AC onto AC′ normal to the second line of vision represented by the arrow $V_V$. A second set of projections are obtained by a series of planes which are perpendicular to the elevation plane XOY through point $V_V$ and the corresponding point of the straight line $Q_V R_V$. The lines thus obtained, such as D‴E‴, will yield the images I of various points of perspective image at their meeting points with corresponding lines such as DE′.

From the above description, it need only be retained that lines, such as DE′ and D″E″, converge and meet at a point $K_H$ which is somewhere along the continuation of the line formed by points $V_H$ and H (normal to a base line AB) and that those lines of a second series such as D″E″ converge to a corresponding point $K_V$ (not shown) which is on the continuation of $V_V H'$.

On this observation is based the principle of the instrument of the invention.

Referring again to FIGURE 3, it may be said that the instrument consists of two straightedges that are travelling on a body displaceable rectilinearly along line AB. The straightedges are adapted to extend on either side of line AB and one of the straightedges is made to, at all times, adapt a direction pointing to point $V_H$. The second straightedge is, at all times, made to adapt a direction continuously pointing to point $K_H$ (shown in FIG. 2 but not in FIG. 3). As the instrument is displaced between points A and B, the straightedges continuously point to their respective points.

It will thus be appreciated that if one of the straight edges is made to contact various predetermined points on the projection of an object located in an orthogonal plane, such as $Q_H R_H$. FIGURE 3. A line drawn with the other straight edge will define the locus of points which are the possible projections of that particular point in the projected plane ABC. By, thereafter, using the instrument on a second line such as line AC' of FIGURE 3, it will be possible to pinpoint the projection on the particular locus, at the instruction of lines such as, for example D"E" and H'E".

The instrument of the invention is an adaptation of the above-mentioned observations and full description thereof will now be given.

Generally, the drawing instrument of the invention comprises a rectilinear track 1 over which is mounted a body 3 (FIG. 6) adapted to be displaced along said rectilinear track 1. Cooperating means 5 (FIG. 4) are provided on said track and body to ensure the positive displacement of body 3 on track 1.

Displacement of body 3 on track 1 is produced by means of the manual driving means 7 (FIG. 4) mounted on body 3 and coupled to cooperating means 5. Operation of the manual driving means causes a non-slip and positive displacement of body 3 over track 1.

First and second straightedges, 9 and 9' respectively, are pivotally mounted, at one end thereof, on body 3 and rotate around a common axis K which is normal to the longitudinal axis of track 1. A first actuating means 11 is operatively joined to the manual driving means 7 and to the first straightedge 9 whereas a second actuating means 13 is connected between the second straightedge 9' and the first actuating means 11. By having first and second actuating means 11 and 13 operatively connected to both straight edge 9 and 9' and to the manual driving means 7, displacement of body 3 through actuation of the manual driving means will cause pivotal action of the first straight edge 9 proportional to the displacement of body 3 and, in turn, the angular displacement of the first straight edge 9 will cause a proportional angular displacement of the second straight edge 9'. A first adjusting mechanism 15 will control the proportionality between the displacement of the first straightedge 9 in relation to that of body 3 whereas a second adjusting mechanism 17 will be responsible for controlling the proportionality between the angular displacement of the second straightedge 9, in relation to the first straightedge 9.

A detailed description of the aforesaid device will now be given.

Body 3 may be any type of frame suitable for holding together the various mechanisms hereinafter described and, for the purpose of the instant description, is shown as an inverted box-like member. It is provided, at one end thereof, with a narrowed extension 19 (FIGS. 6 and 7) to which are pivotally mounted the straightedge 9 and 9'. As aforesaid, these straightedges are rotatable on a common pin or shaft 21 extending through one end of each of the straightedges and fixed to extension 19. It should be noted at this time that the ruling edges 23 and 23' of the straightedges must project radially from the common axis K. Each straightedge is composed of a radial arm 25 below which is connected a ruler 27 adapted to lie flat on the surface over which the instrument is to be used.

Rulers 27 actually provide stability to body 3 which otherwise is mounted on a rear wheel 29 and a front wheel 31, centrally thereof. Each of wheels 29 and 31 are bevelled and fit into track 1 which has correspondingly inclined lateral walls 33.

The cooperating means 5 which serves to ensure positive displacement, without slipping, of body 3 over track 1, consists of a toothed wheel 35 which may be formed by the outer surface of the rim of bevelled rear wheel 29. The bottom surface of track 1 is formed as a track 37 over which meshes toothed wheel 35. The rear wheel 29 and toothed wheel 35 are brought into rotation, and body 3 displaced along track 1, by means of the manual driving means 7 which consists of a worm gear 39 mounted on an axle 41 at one end of which is secured an operating knob 43. The worm gear meshes with a cooperating gear 45 secured onto a shaft 47 over which is also fixed the bevelled wheel 29 and its toothed rim 35. Manual driving means 7 therefore serves to drive the cooperating means 5 to ensure positive and calibrated displacement of the body over track 1.

The first actuating means 11, controlling the pivoting or angular action of straight edge 9, comprises a rod 49 one end of which is formed as a ball 51 slidable in a circular race 53 extending longitudinally of radial arm 25 of straight edge 9. The center of the ball must be in exact prolongation of edge of straightedge 23, as is the case of axis K. The rod communicates with race 53 through an elongated opening 55 extending longitudinally of the circular race and forming, therewith in cross-section, a key-hole slot, as shown in FIGURE 4.

Figure 4:
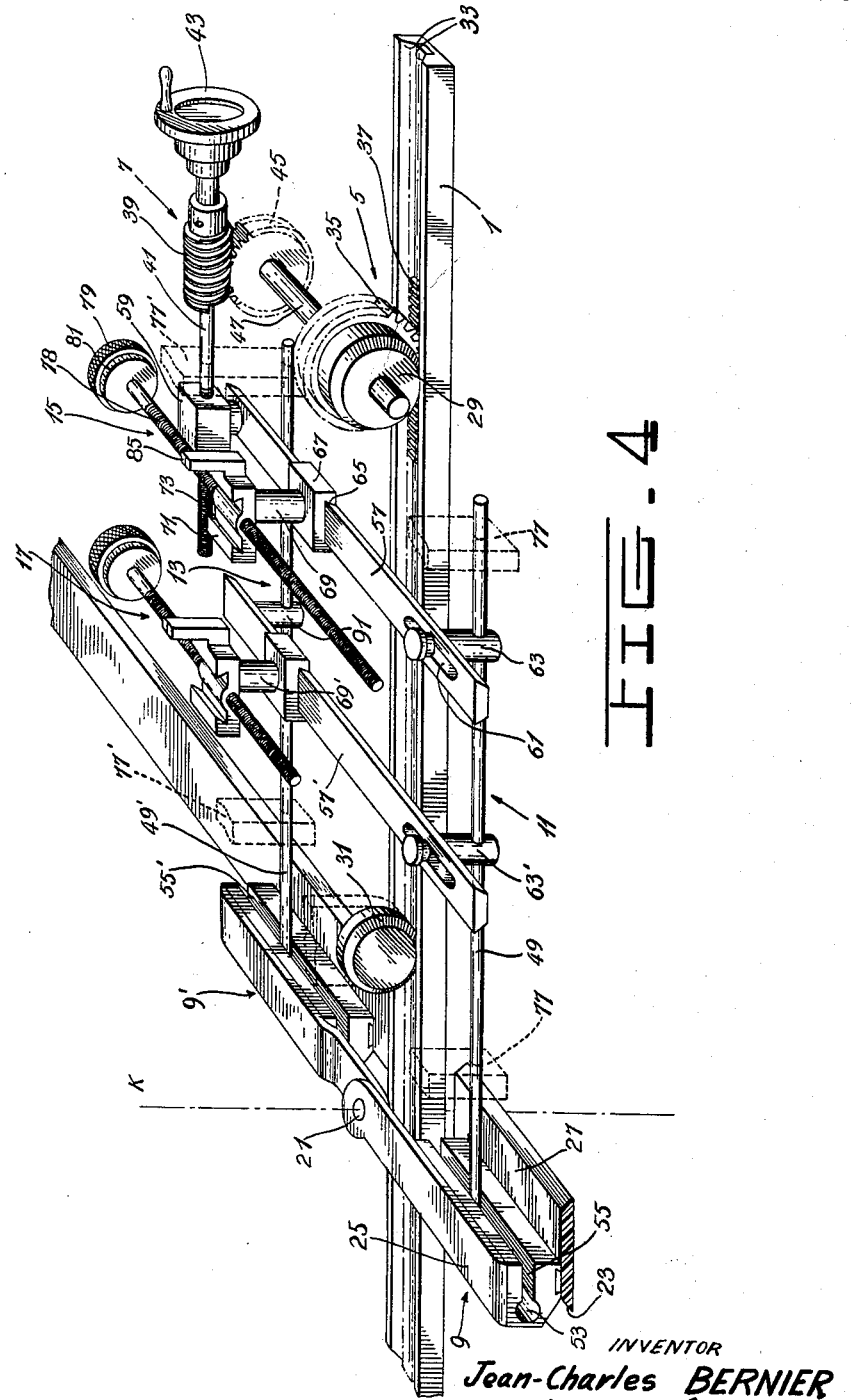
FIGURE 4 is an isometric perspective view showing the various mechanical components of the instrument assembled in their proper relationship but not including the body portion thereof.

First actuating means 11, also comprises a transverse lever 57 which is, preferably, an elongated member having bevelled edges as best seen in FIGURE 4. One end of lever 57 pivotally connects to a block 59 screwed to a threaded end of axle 41 of the manual driving means 7. At the other end of the lever 57 is provided with a lost-motion slot 61 through which extends the reduced and capped end of a guiding peg 63, the other end of which is fixedly secured to rod 49.

Figure 7:
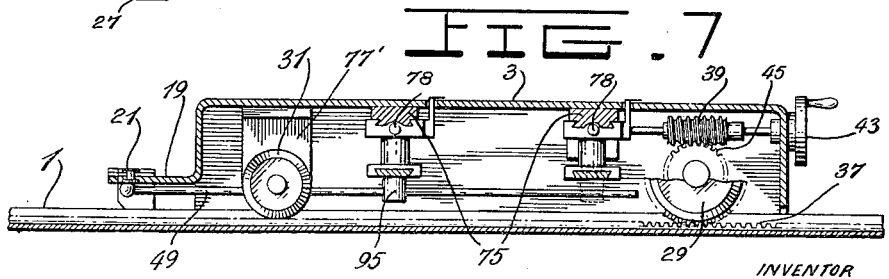
FIGURE 7 is a sectional elevation of the instrument taken along line 7—7 of FIGURE 6.

Lever 57 slides, through its bevelled edges, in a dovetail groove 65 cut out of the bottom portion 67 of an upstanding lug 69, the upper portion 71 of which also has a dovetail groove 73. FIGURE 7 will show that the latter dovetail 73 cooperates with a male member provided on a beam 75 extending transversally of and secured to, the top wall of body 3 whereby upper portion 71 can only slide transversally of body 3. The lower portion 67, however, is made to pivot about the vertical axis of lug 69.

Rod 49 is made to axially move longitudinally parallel to track 1 by sliding through upstanding brackets 77 fixed to body 3.

Figure 6:
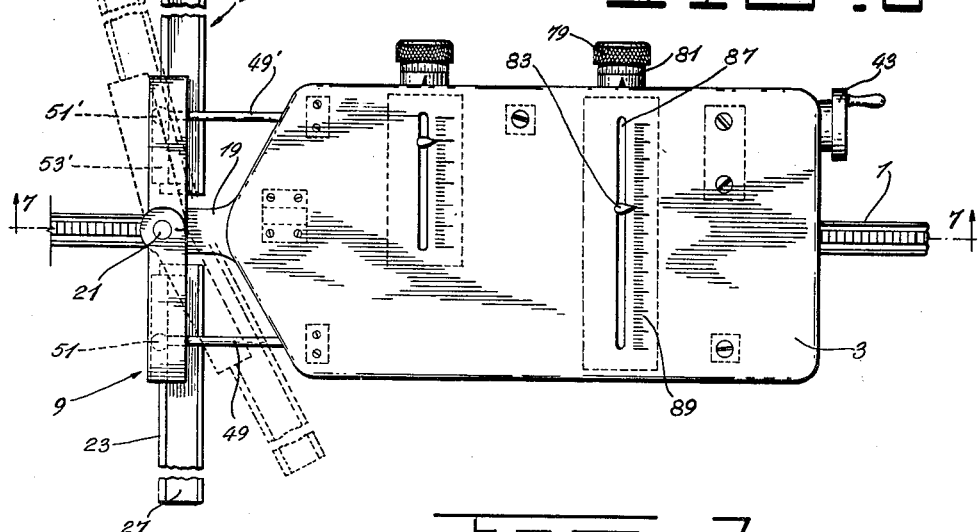
FIGURE 6 is a plan view of the whole instrument.

Transverse adjustment of lug 69 is made possible through first adjusting mechanism 15 consisting of a threaded rod 78, rotatable but non-axially movable, and mounted onto body 3 by any known means, not shown. Rod 78 is brought into rotation by means of a knurled wheel 79 and minute displacements are made possible through a micrometric dial 81 (FIG. 6). An indicating finger 83, secured at the end of an upstanding member 85, projects through a transverse slot 87 in the top surface of body 3, and is used in conjunction with a calibrated scale 89 to control the lateral movement of lug 69 and, therefore, of the vertical pivoting axis of lever 57.

It will therefore be understood that rotation of knob 43 will cause rectilinear displacement of body 3 through cooperating means 5 and will also displace block 59 by reason of the axle 41 being threaded through the block. Movement of block 59 along the axis of axle 41 will cause the pivoting of lever 57 around the vertical axis of lug 69. This movement in turn will displace rod 49 in a longitudinal direction parallel to track 1. It is therefore seen that a predetermined displacement of body 3 over track 1 will cause a proportional predetermined angular displacement of straight edge 9.

The mechanisms used in the operation of the second straightedge 9' are very similar to those just described and, for that reason, wherever corresponding elements are used, the same reference numerals will be referred to but will be primed.

The second actuating means 13 is composed of a rod 49', slidable in two upstanding brackets 77' secured to body 3. Rod 49' is only afforded an axial displacement parallel to the axis of track 1.

FIGURE 6 shows that rod 49' is terminated by a ball 51' slidable in a circular race 53' while the end part thereof is displaceable in an opening 55'.

Intermediate of the ends of rod 49 of first actuating means 11, between guiding peg 63 and straight edge 9, is secured an upstanding peg 63' which, likewise to peg 63, slidably receives one end of a transverse lever 57'.

This lever 57', like is predecessor 57, is slidably guided through an upstanding lug 69' and has the second end rotatably mounted on a securing peg 91, fixed to rod 49'.

A second adjusting mechanism 17 is provided for the adjustment of the pivotal axis of upstanding lug 69' in a manner to that of the first adjusting mechanism 15. The mechanism being identical, it is not believed necessary to repeat the description.

The operation of the drawing instrument can now be completed.

Whenever rod 49 is axially displaced, due to operation of manual driving means 7, and first straightedge 9 is angularly rotated, the lever 57' pivots about the vertical axis of lug 69' and this movement is transmitted to the second rod 49' which, likewise to first rod 49, moves axially to bring about rotation of the second straightedge 9'.

It will therefore be appreciated that the angular movement of the second straightedge is proportional to the angular displacement of the first straightedge 9 and that the amplitude or extent of the angular displacements of straightedges 9 and 9' can be adjusted by means of the first and second adjusting mechanisms 15 and 17 respectively.

Figure 5:
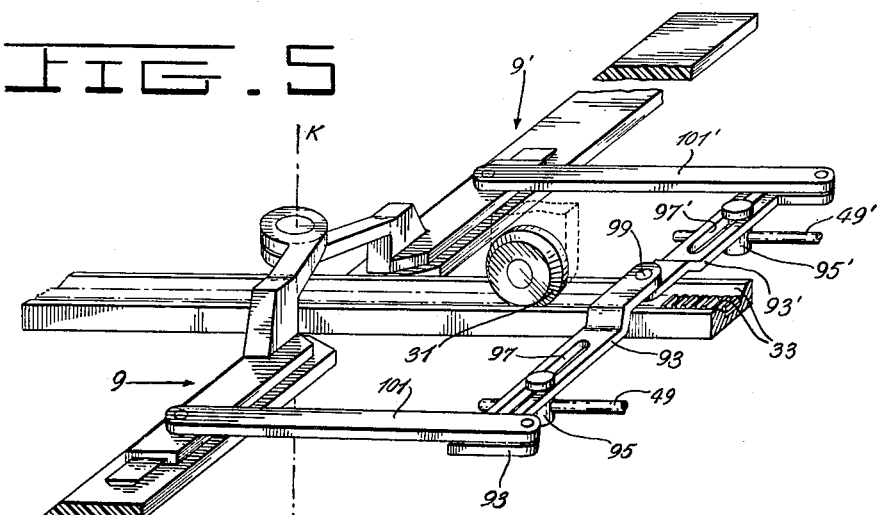
FIGURE 5 is an isometric perspective view of a modified version of part of the straight edge actuating mechanism.

FIGURE 5 shows a modified and more practical embodiment of the connection between the rods 49 and 49' and their respective straightedges 9 and 9'; the purpose of the embodiment being to avoid the necessity of having a ball or pivot in the vertical plane containing both the axis K and the ruling edge of each straightedge.

In this case the ends of the actuating rods 49, 49' are connected to L-shaped levers 93, 93' through guiding pegs 95, 95' similar to guiding pegs 63, 63' and likewise slidable in lost motion slots 97, 97' of the L-shaped levers 93, 93'. These levers are connected at one end thereof to a common pin 99 secured to body 3. The levers 93, 93' are pivotable around that pin.

The outer ends of levers 93, 93' are each connected to an operating arm 101, 101' in a pivotal manner and the arms 101, 101' are in turn connected to each of straightedges 9 and 9' respectively. It will, therefore, be understood that whenever rod 49 is axially displaced, it brings into rotation the straightedge 9 and this movement is transmitted to the second rod 49' through the second actuating means 13 to the second straightedge 9'.

Although a specific embodiment of the invention has just been described, it will be understood that modifications thereto can be made without departing from the spirit and scope of the invention as set forth in the appended claims.

I claim:

1. A perspective drawing instrument comprising: a rectilinear guiding track; a travelling body; cooperating means on said track and body to ensure positive displacement of said body on said track; manual driving means on said body connected to said cooperating means to cause displacement of the body on said track; first and second straightedges pivotally mounted, at one end thereof, on said body on a common axis normal to the axis of said track; first actuating means operatively joined to said manual driving means and to said first straightedge to pivot the latter in angular displacement proportional to the displacement of said body; second actuating means operatively joined to said first actuating means and to said second straightedge to cause angular displacement thereof proportional to the angular displacement of said first straightedge.

2. A perspective drawing instrument comprising: a rectilinear guiding track; a travelling body; cooperating means on said track and body to ensure positive displacement of said body on said track; manual driving means on said body connected to said cooperating means to cause displacement of the body on said track; first and second straightedges pivotally mounted, at one end thereof, on said body on a common axis normal to the axis of said track; first and second driving rods, one on each side of said track, axially displaceable in parallel relation with the longitudinal axis of the track; each rod having one end connected to the corresponding straightedge to cause pivoting thereof around said common axis; a first interconnecting mechanism between said first driving rod and said manual driving means whereby actuation of the latter will cause proportional displacement of said first rod and pivot the corresponding straightedge and a second interconnecting mechanism between said first and second rods whereby angular displacement of said first rod will cause proportional displacement of said second rod and pivot the corresponding straightedge.

3. An instrument as claimed in claim 2 wherein said first and second interconnecting mechanisms each includes a transverse lever pivotable around a vertical axis; one end of said levers being connected to said first driving rod; the other end of one of said levers being connected to the manual driving means and the other end of the other lever being connected to said second driving rod.

4. An instrument as claimed in claim 3, wherein the vertical axes are transversally adjustable.

5. An instrument as claimed in claim 2 wherein said cooperating means comprises: a rack on said guiding track and a toothed driving wheel mounted on said body and meshing with said rack.

6. An instrument as claimed in claim 3 wherein said cooperating means comprises; a rack on said guiding track and a toothed driving wheel mounted on said body and meshing with said rack and wherein said manual driving means comprises cooperating worm and worm gear; a common transverse shaft for mounting said toothed wheel and worm gear; said worm being secured to a longitudinal axle having a threaded end; a block pivoted to the end of said lever connected to said driving means and having a threaded hole therein for the reception of said threaded axle whereby rotation of said worm displaces said body on said track and moves said block to cause pivoting of said lever.

7. An instrument as claimed in claim 2 wherein each rod is provided with a ball at one end thereof; each straightedge has a keyhole slot extending longitudinally thereof and facing rearwardly of its tracing edge; said ball being adapted to move in the race of said keyhole slot.

8. An instrument as claimed in claim 2 wherein one end of said rods are connected to L-shaped levers having one end pivotally fixed to said body on a vertical axis; arms having one end connected to one of the straightedges and the other arm pivotally joined to the free end of one of said L-shaped levers.

References Cited in the file of this patent

UNITED STATES PATENTS 2,330,414    Elwert _____ Sept. 28, 1943
2,714,253    Stone _____ Aug. 2, 1955